US008543638B2

(12) United States Patent
Nathan et al.

(10) Patent No.: US 8,543,638 B2
(45) Date of Patent: Sep. 24, 2013

(54) SECURITY SYSTEM FOR A BROWSER-BASED ENVIRONMENT

(75) Inventors: Adam D. Nathan, Redmond, WA (US); Andrew Sterland, Redmond, WA (US); Michael J. Leonard, Lake Stevens, WA (US); Timothy Rice, Bellevue, WA (US); John I. Montgomery, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 931 days.

(21) Appl. No.: 11/903,598

(22) Filed: Sep. 24, 2007

(65) Prior Publication Data

US 2009/0083860 A1    Mar. 26, 2009

(51) Int. Cl.
*G06F 15/16* (2006.01)
(52) U.S. Cl.
USPC ............................ 709/203; 709/204; 709/205
(58) Field of Classification Search
USPC ................. 709/229, 225, 226, 230, 238, 313, 709/203–205; 726/6, 9
See application file for complete search history.

(56) References Cited

U.S. PATENT DOCUMENTS

| | | | |
|---|---|---|---|
| 6,567,852 B2 | 5/2003 | Besaw et al. | |
| 6,760,844 B1 | 7/2004 | McCarthy et al. | |
| 6,785,891 B1 | 8/2004 | Allen et al. | |
| 6,985,953 B1* | 1/2006 | Sandhu et al. | 709/229 |
| 7,139,799 B2 | 11/2006 | Qian et al. | |
| 7,216,236 B2 | 5/2007 | Kou et al. | |
| 7,426,699 B2* | 9/2008 | Schneider | 715/804 |
| 7,730,419 B2* | 6/2010 | Schneider | 715/804 |
| 7,904,520 B2* | 3/2011 | Neal et al. | 709/206 |
| 2002/0165967 A1* | 11/2002 | Morgan | 709/227 |
| 2003/0037131 A1 | 2/2003 | Verma | |
| 2005/0055458 A1* | 3/2005 | Mohan et al. | 709/238 |
| 2005/0204148 A1 | 9/2005 | Mayo et al. | |
| 2005/0229188 A1* | 10/2005 | Schneider | 719/328 |
| 2006/0101114 A1 | 5/2006 | Sandhu et al. | |
| 2008/0281921 A1* | 11/2008 | Hunt | 709/206 |
| 2009/0055908 A1* | 2/2009 | Rapoport | 726/6 |

OTHER PUBLICATIONS

Bayardo JR., et al., "Peer-to-Peer Sharing of Web Applications", Date: May 20-24, 2003.
Hurst Dennis, "Share session state between ASP and ASP.NET apps", http://searchvb.techtarget.com/tip/1,289483,sid8_gci951935,00.html.
Park, et al., "Secure Cookies on the Web", Date: Jul.-Aug. 2000, pp. 36-44.

* cited by examiner

*Primary Examiner* — Brian P Whipple
(74) *Attorney, Agent, or Firm* — Michael B Dodd; Dodd Law Group

(57) ABSTRACT

Various technologies and techniques are disclosed for enhancing security in a browser-based environment. A first browser application hosts one or more other applications. The first browser application is operable to load the one or more other applications on one or more separate domains than a host domain, using one or more cookies as a communication method between the first browser application and the one or more other applications. Input is received from a user to access a first browser application on a first domain. A selection is received from the user to run a second browser application from within the first browser application. A first cookie is created in a second domain, with the first cookie containing information to be used by the second browser application. The second browser application is loaded on the second domain. For example, the first browser application can be a browser-based software development application.

19 Claims, 9 Drawing Sheets

SECURITY SYSTEM FOR A BROWSER-BASED ENVIRONMENT

BACKGROUND

Web browsers enable users to browse the Internet to access various web pages that contain information. Often times, web pages actually host other software applications, such as an online calendar, an online diary, a document management system, and so on. Web browsers commonly store information that is useful for a given application on the hard drive of a user in the form of what is called a "cookie". For security reasons, a cookie can only be read by the specific web domain for which the cookie was set. As an example, a cookie might contain the user name and password for a user for accessing a particular web application. Such information might have been stored in the cookie after the user selected an option from within the web application to store his login credentials for faster access on future visits. In this example, the cookie is then read by the application on future visits to facilitate a quick login. This cookie containing the user's login credentials, however, cannot be read by a web application on a different domain than the domain for which the cookie was created.

As web development techniques have advanced, it has become easier for multiple applications to be displayed from within the same host application. The concept of displaying multiple applications together to the user in a single web page is often referred to as a "mash-up". When multiple applications are hosted in a single page or application, they end up sharing the same host domain. This means that a first application on a particular host domain can access the cookies set by the second application on the particular host domain because they are both running on the same domain. There are times when this is not desirable for security and privacy reasons, such as when the applications are supported by totally separate companies and/or individuals.

SUMMARY

Various technologies and techniques are disclosed for enhancing security in a browser-based environment. A first browser application is operable to host one or more other applications. The first browser application is further operable to load the one or more other applications on one or more separate domains than a host domain, using one or more cookies as a communication method between the first browser application and the one or more other applications.

In one implementation, input is received from a user to access a first browser application on a first domain, which is the host domain. A selection is received from the user to run a second browser application from within the first browser application. A first cookie is created in a second domain, with the first cookie containing information to be used by the second browser application. The second browser application is then loaded on the second domain.

In another implementation, the first browser application is a browser-based software development application. Input is received from a first user to create an application using a browser-based development application. Input is then received from the first user to share the application. Input is later received from a second user to log in to the browser-based development environment, and to then browse to the application created by the first user. A first cookie is set on a computer of the second user with information for loading the application created by the first user. The application is then loaded on a separate domain from the host domain of the browser-based development environment. In one implementation, the first cookie is accessed upon loading the application to retrieve the information that may be helpful to the loading of the application.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as techniques for enhancing the security of browser-based applications, but the technologies and techniques also serve other purposes in addition to these. In one implementation, one or more of the techniques described herein can be implemented as features within a browser-based software development application such as MICROSOFT® Popfly, or from any other type of program or service that allows for creation and/or display of multiple browser-based applications from within a single host application.

Figure 1:
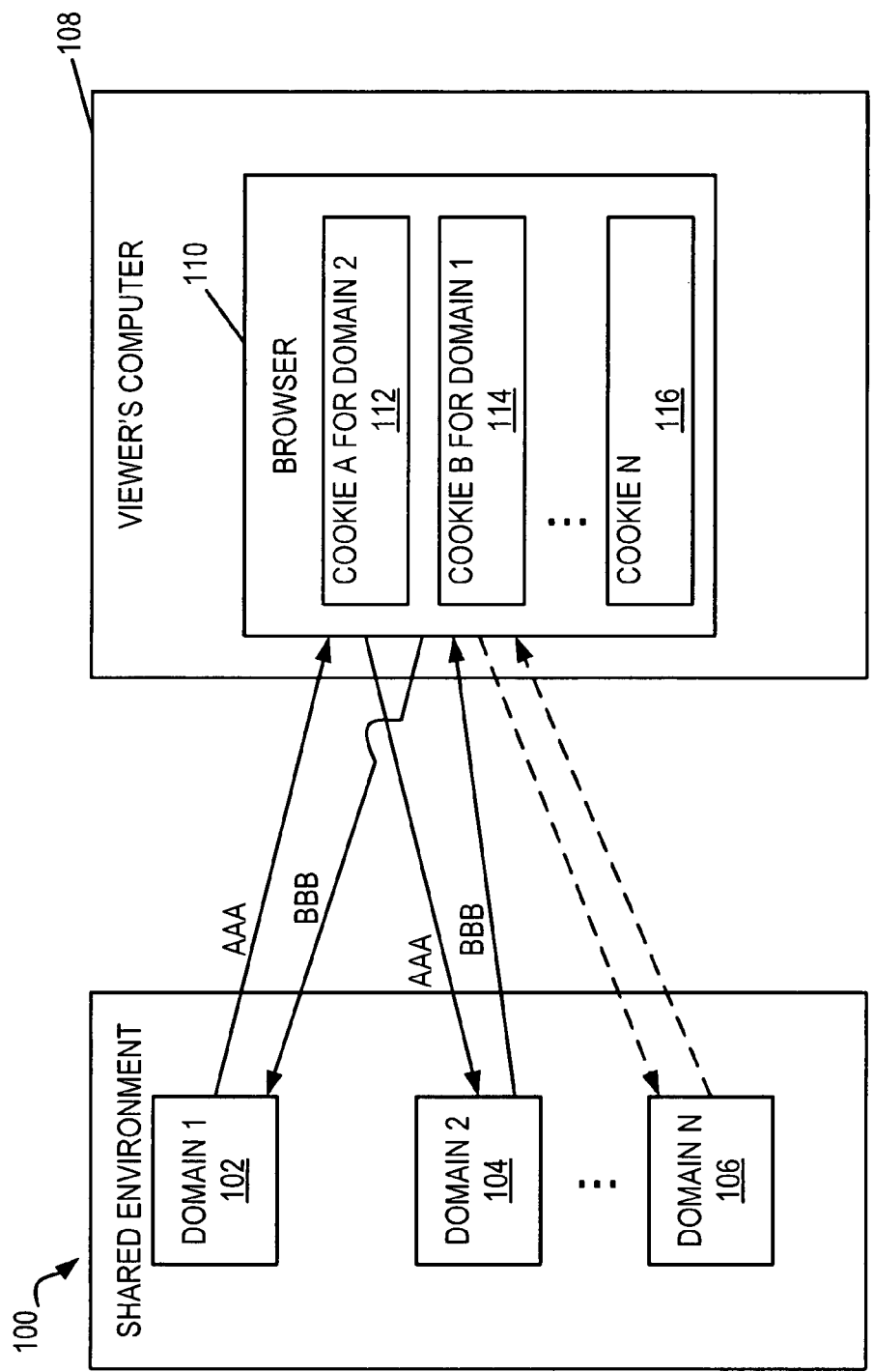
FIG. 1 is a diagrammatic view of a security system of one implementation that uses cookies for communication across applications in a shared environment running on different domains.

FIG. 1 is a diagrammatic view of a security system 100 of one implementation that uses cookies for communication across shared applications being executed on different domains. In the example shown, a shared environment contains multiple domains (102, 104, and 106, respectively). The term "domain" as used herein is meant to include isolated boundaries of execution for a browser-based application, such as separate web domains. This shared environment 100 can be a browser-based software development environment or any other type of program or service that creates and/or displays multiple browser-based applications from within a single host application. The security system 100 shown in FIG. 1 also contains a viewer's computer 108. Viewer's computer contains a web browser 110 that has access to various cookies (112, 114, and 116, respectively). The term "cookie" as used herein is meant to include a file or other data structure stored on a storage system that is used by a browser-based application.

A main application in the shared environment (such as a software development application) launches each application in a separate domain (102, 104, 106, etc.) to provide an extra level of security. The extra level of security is provided because the cookies (112, 114, 116, etc.) that are set for each separate domain cannot be accessed by the other applications on separate domains, even though they are all running under the same shared environment (e.g. host application). Furthermore, a given cookie (112, 114, or 116) can be set for one application upon request of another application through the shared environment to enable communication between the applications across domains. The loading of applications from the shared environment on different domains and the usage of cookies to share information between applications in the shared environment is described in much greater detail in the figures that follow.

Figure 2:
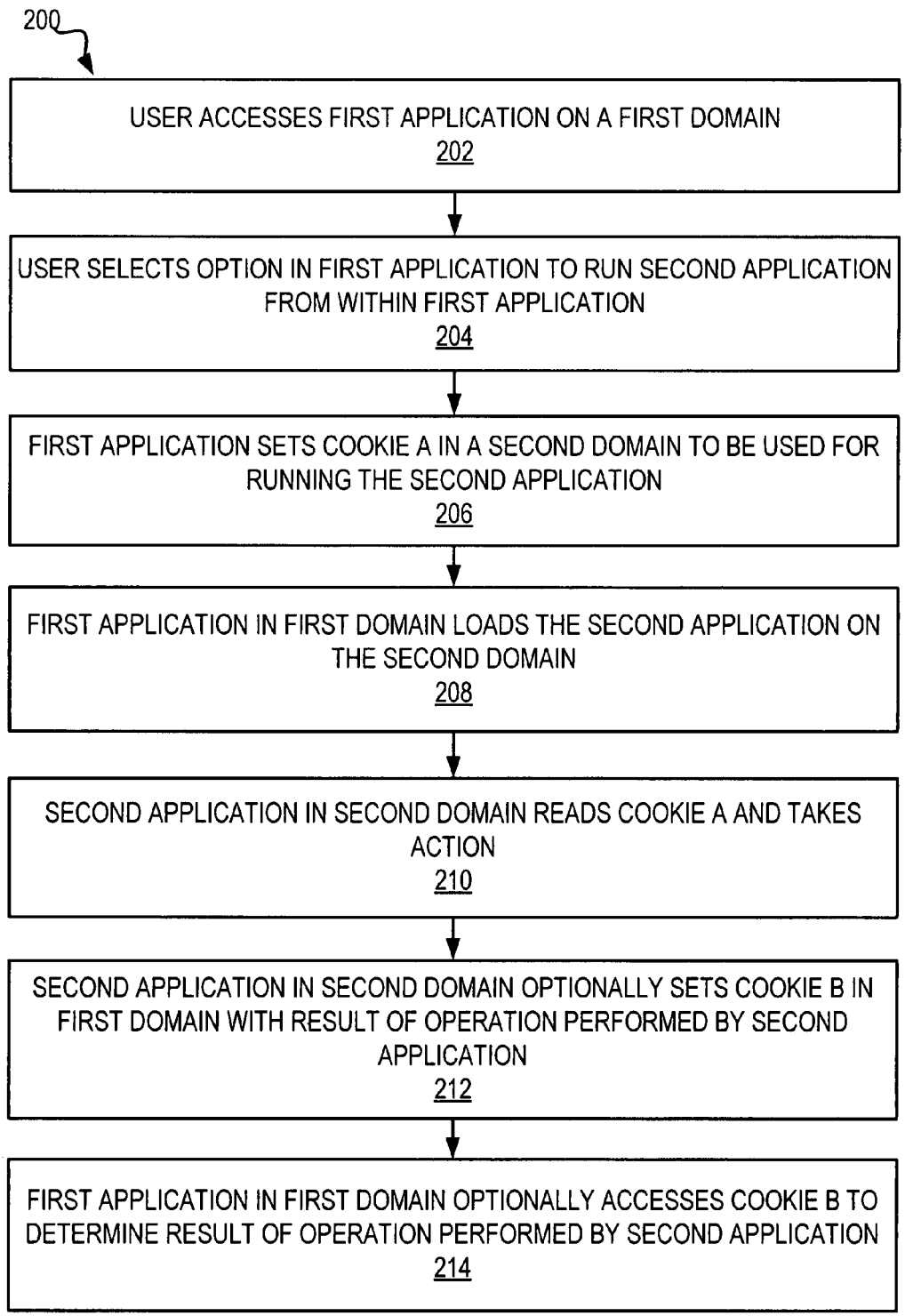
FIG. 2 is a high-level process flow diagram for one implementation of the system of FIG. 1.

Turning now to FIGS. 2-8 with continued reference to FIG. 1, the stages for implementing one or more implementations of security system 100 are described in further detail. In some implementations, the processes of FIGS. 2-8 are at least partially implemented in the operating logic of computing device 500 (of FIG. 9). FIG. 2 is a high level process flow diagram 200 for one implementation of security system 100. The user accesses the first application on a first domain (stage 202) using a web browser. The user selects an option in the first application to run a second application from within the first application (stage 204). The first application sets cookie A in a second domain to be used for running the second application (stage 206). In one implementation, the first application sets cookie A by loading a page in a second application on the second domain. The first application in the first domain then loads the second application on the second domain (stage 208). The second application in the second domain reads cookie A and takes action (stage 210), such as to complete the loading of the second application based upon the information in cookie A. At a later point in time, the second application in the second domain optionally sets cookie B in the first domain with a result of one or more operations performed by the second application (stage 212). In one implementation, cookie B is set when the second application loads a page of the first application on the first domain. The first application in the first domain optionally reads cookie B to determine the result of the operation performed by the second application (stage 214).

Figure 3:
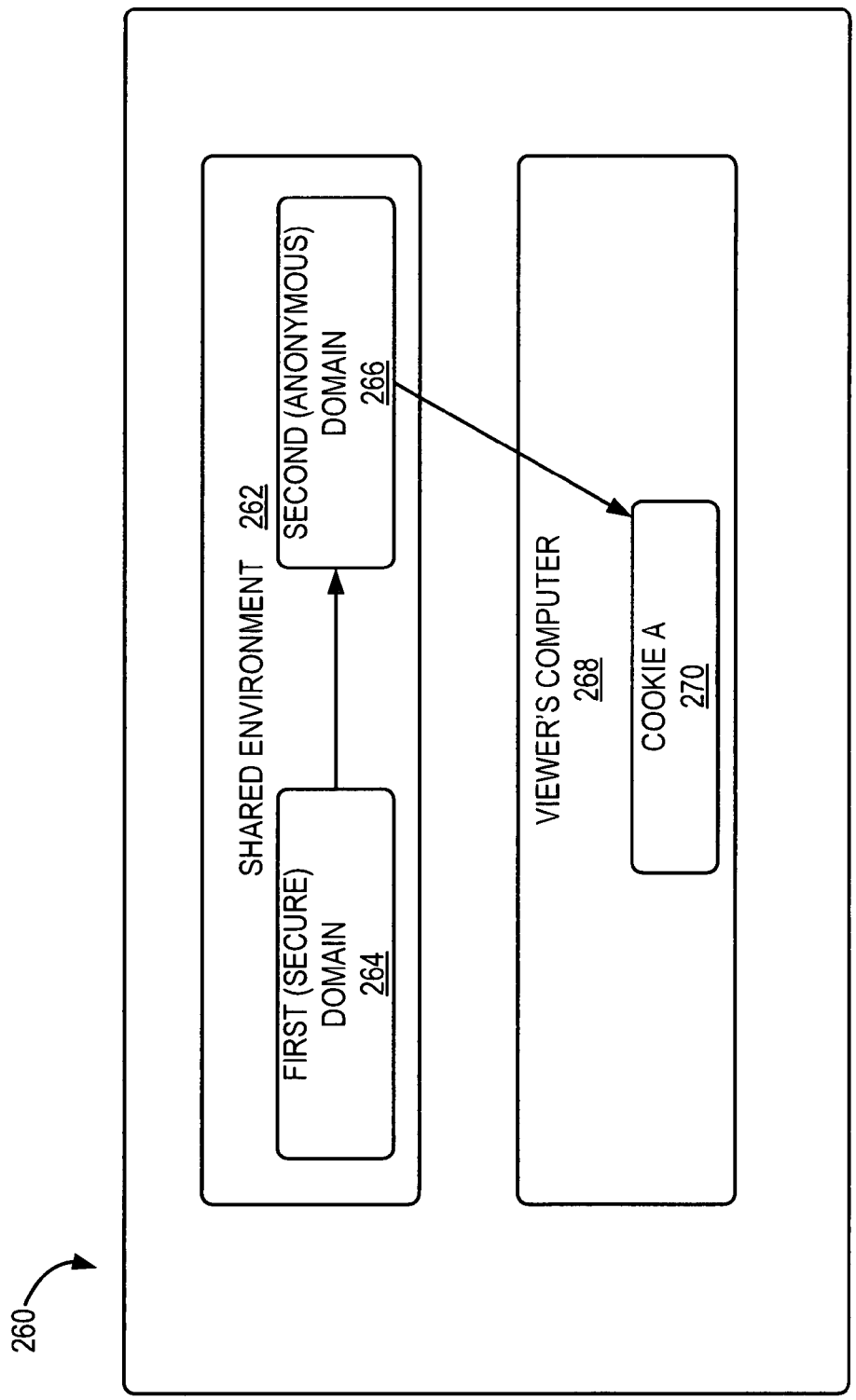
FIG. 3 is a logical diagram for one implementation illustrating an application a first domain setting a cookie in a second domain.

Turning now to FIG. 3-6, logical diagrams are shown to further illustrate the stages described in FIG. 2 using an example of a multi-user browser-based shared environment. The same reference numbers are used to refer to the same items. FIG. 3 is a logical diagram 260 illustrating an application on a first domain setting a cookie in a second domain. A shared environment 262 is shown with a first domain 264 and a second domain 266. A few non-limiting examples of a shared environment can include a software development environment, a portal or other application providing applications from different sources, and so on. In one implementation, shared environment 262 is hosted on one or more web servers. The first domain 264 is a secure domain that the users log in to in order to create, preview, save, and/or share their applications in the shared environment 262. The second domain 266 is an anonymous domain that viewers of the applications will actually view the application from, such as viewer's computer 268.

As shown in FIG. 3, the first (secure) domain 264 loads a page in the second (anonymous) domain 266 to set cookie A 270 for the second domain 266 on viewer's computer 268. In one implementation, cookie A 270 is set for the second domain 266 by the main application of the shared environment 262 when the user selects an option to access a particular application that was created by a different user. Cookie A 270 can contain information that is used by the particular application to operate, such as user login credentials for faster logins, other user preferences, and so on. Once cookie A 270 is set, the particular application can be loaded by the main application of the first domain 264 to run on the second domain.

Figure 4:
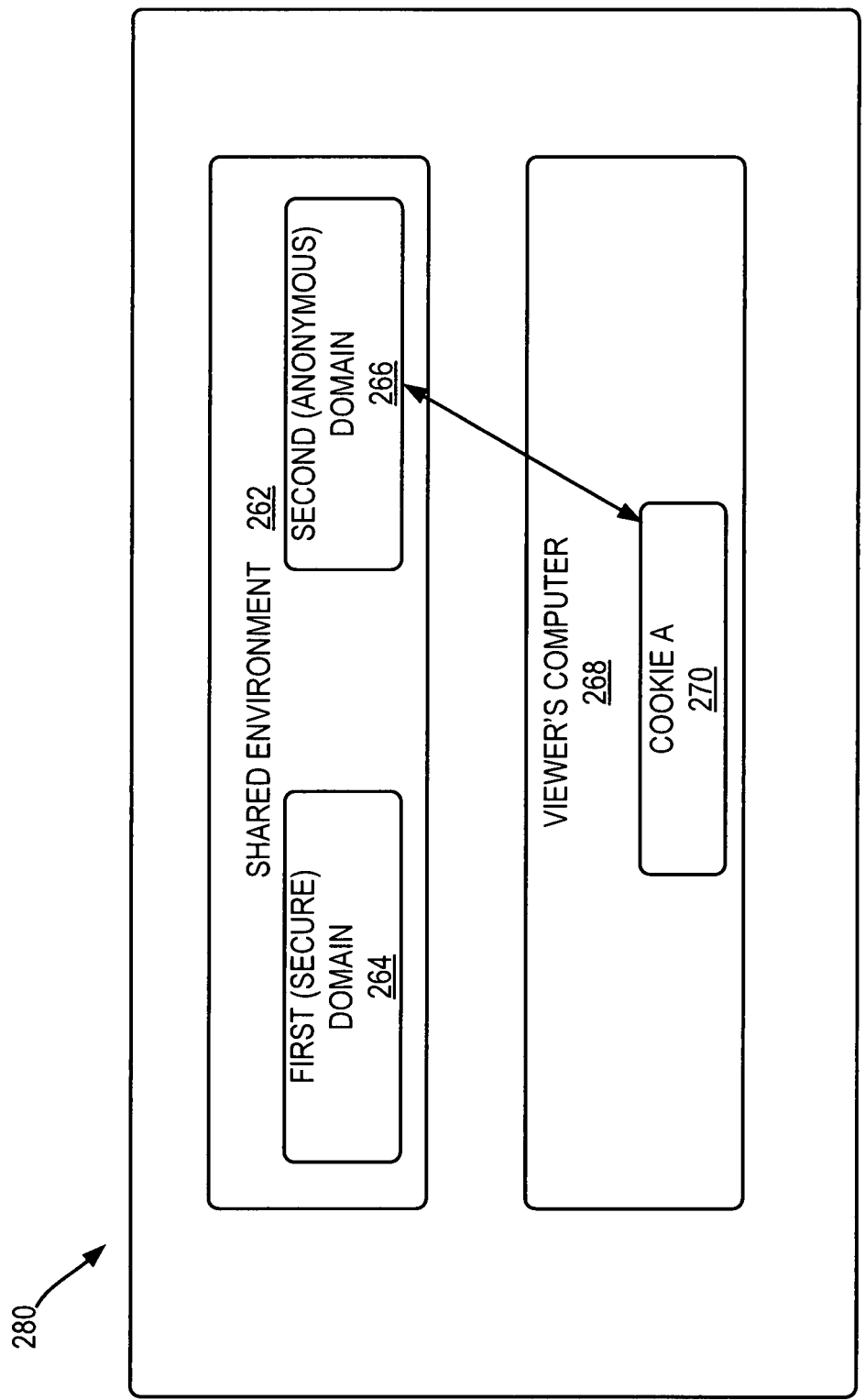
FIG. 4 is a logical diagram for one implementation illustrating an application on the second domain taking action based on the cookie set in the example of FIG. 3.

Continuing the example with FIG. 4, a logical diagram 280 is shown with the particular application on the second domain taking action based on the cookie (cookie A 270) that was set on viewer's computer 268 in the example of FIG. 3. The particular application being launched on the second domain 266 polls for cookie A 270 and takes action based on cookie A 270. In other words, as the particular application is loaded on the second domain 266, or at a later time during the execution of the particular application, cookie A 270 is accessed to retrieve information that is useful to the operation of the particular application. In many scenarios, this access will take place on launch of the application, but cookies can also be accessed at later times to retrieve information if desired.

Figure 5:
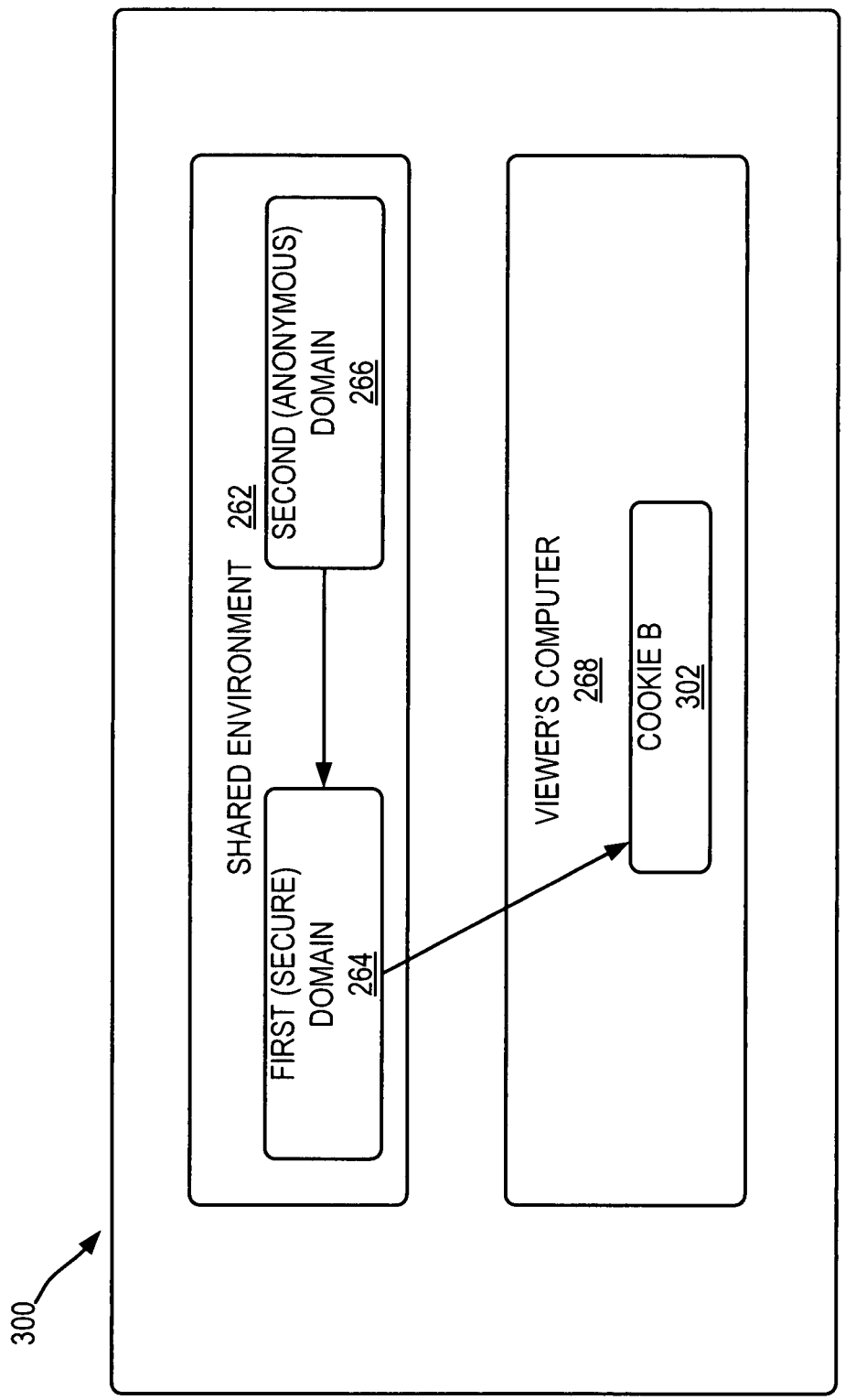
FIG. 5 is a logical diagram for one implementation illustrating the application on the second domain setting a cookie in the first domain to post the results of an operation.

Turning now to FIG. 5, the example continues with a logical diagram 300 illustrating the particular application on the second domain 266 setting a cookie (cookie B 302) for the first domain 264 on viewer's computer 268 to post the results upon completion of one or more operations performed by the particular application. To set cookie B 302, the particular application on the second domain 266 loads a page on the first domain 264 that creates the cookie with results. In one implementation, the posting of results is optional.

Figure 6:
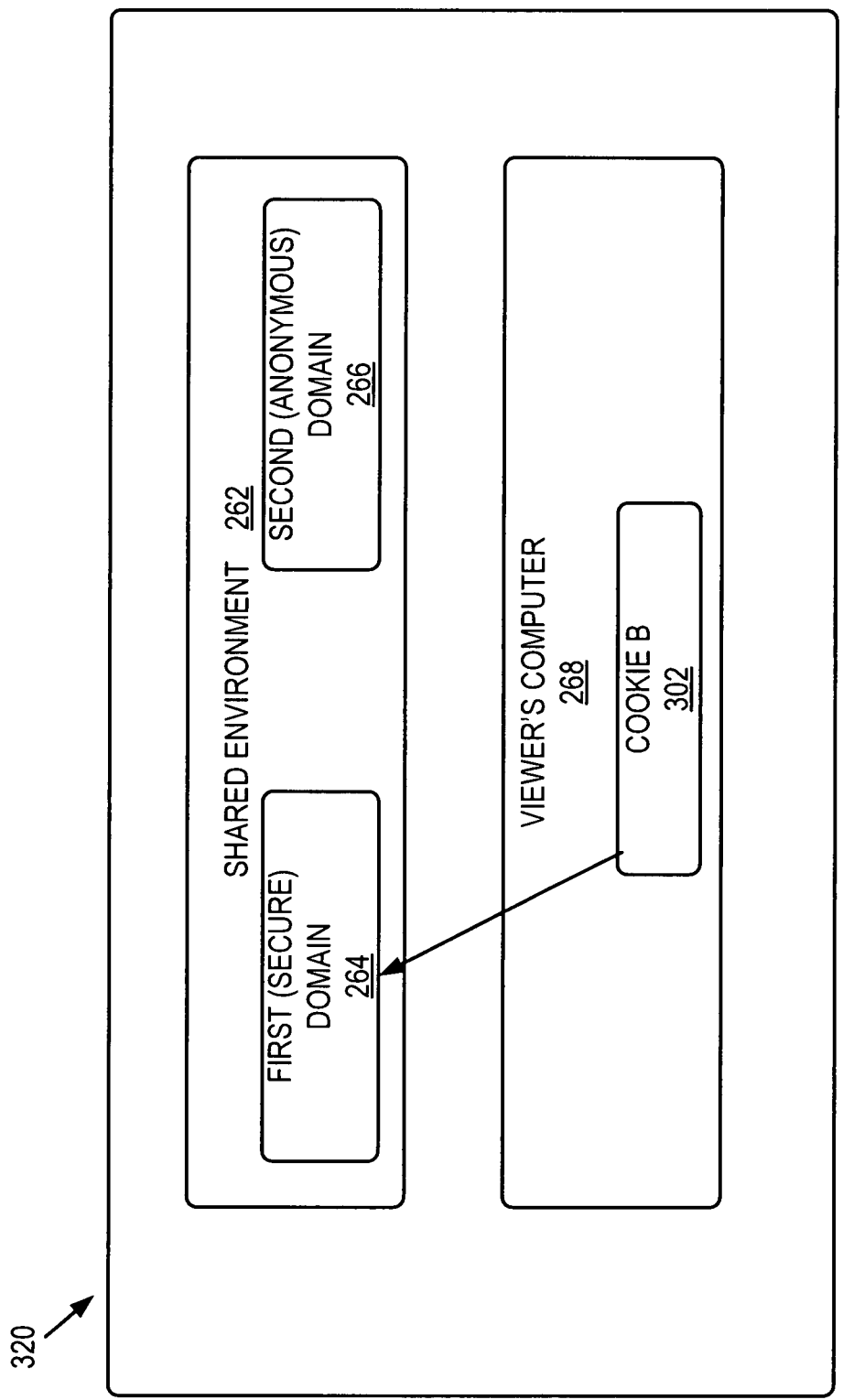
FIG. 6 is a logical diagram for one implementation illustrating an application in the first domain accessing the cookie set in the example of FIG. 5 to determine the result of the operation.

Continuing with FIG. 6, a logical diagram 320 illustrates the main application in the first domain 264 of shared environment 262 accessing the cookie (cookie B 302) set in the example of FIG. 5 to determine the result of the operation. After accessing cookie B 302 to determine the results of the operation(s) performed by the particular application, the main application on the first domain 264 can then take appropriate action based on the results. Some non-limiting examples of appropriate actions can include using the results to update the display of part of the main application, using the data results in another part of the main application, and so on. In one implementation, this stage of accessing the results is optional, such as when the main application on the first domain 264 of shared environment 262 does not need to know about and/or take action based upon the result of the operation performed by the particular application on the second domain 266.

As just illustrated in FIGS. 3-6, by launching the particular application on the second domain 266 (as opposed to the first domain 264), the particular application can only read cookies that are set for the second domain 266, which in this example is cookie A 270. However, since cookie A 270 was originally created for the second domain 266 upon request of the main application on the first domain 264, the cookie serves as a way for the two applications to communicate with one another while also providing an extra level of security through the cookie isolation boundaries. Similarly, cookie B 302 was created upon request of the particular application on the second domain 266 to communicate the results of the operation(s) to the first domain 264, and cookie B 302 can only be accessed by the first domain 264. For the sake of simplicity, this example and some others herein just describe two applications, but in other examples, more applications could also use some or all of these techniques. Furthermore, while the examples used herein describe the setting of cookies by loading a web page, any approach that would allow a cookie to be set for a domain could also be used.

Figure 7:
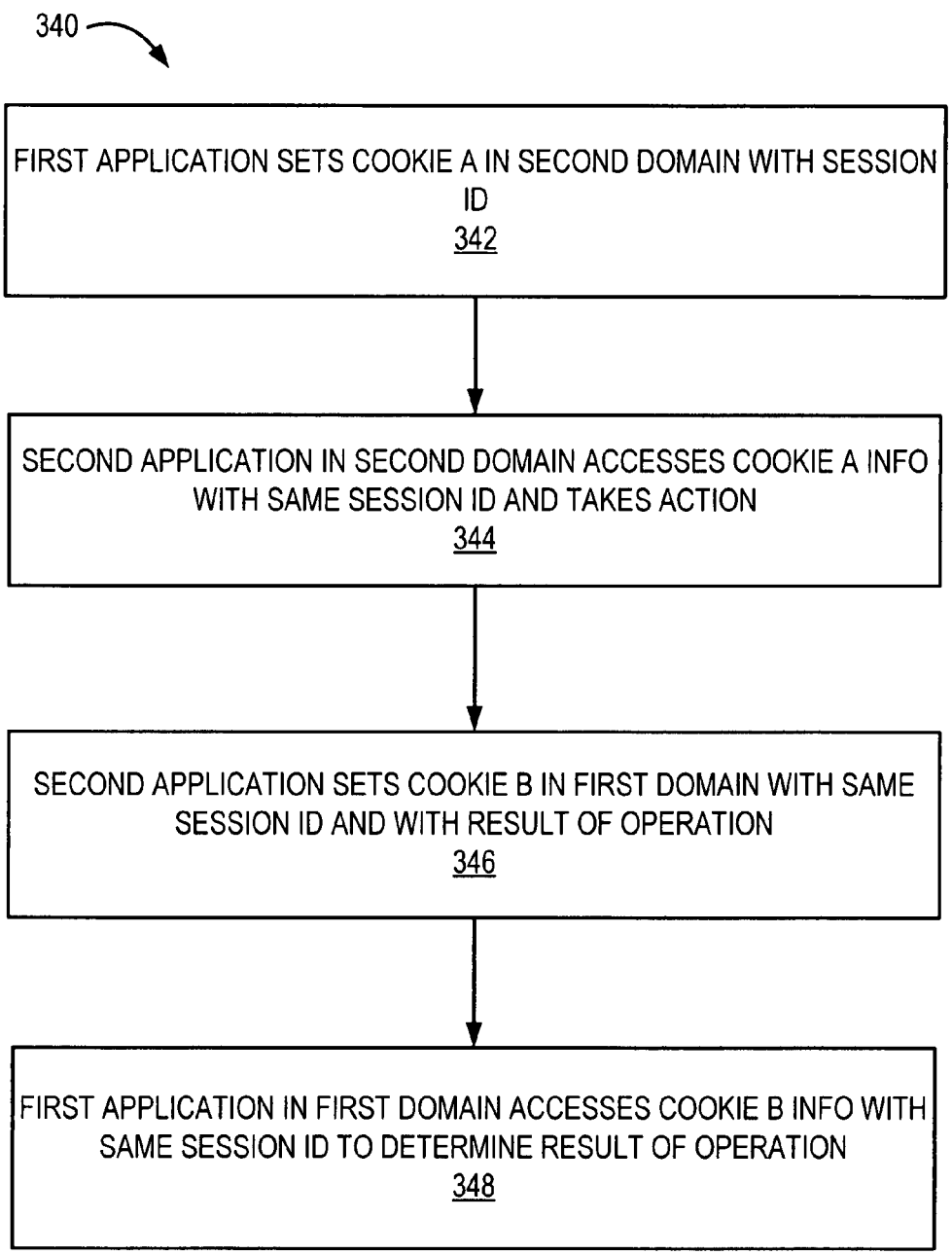
FIG. 7 is a process flow diagram for one implementation that illustrates the stages involved in using session identifiers in cookies to support multiple instances of communication between domains.

Turning now to FIG. 7, a simplified explanation of the stages 340 involved in using session identifiers in cookies to support multiple instances of communication between domains is described for one implementation. A first application in the first domain sets cookie A in a second domain with a session identifier (stage 342), such as by loading a page on the second domain. A second application in the second domain reads the information in cookie A that contains the same session identifier and takes action (stage 344), such as using the cookie information during the loading the second application. To post the results, the second application sets cookie B in the first domain with the same session identifier and with the result of the operation (stage 346). The first application in the first domain reads the information in cookie B with the same session ID to determine the result of the operation (stage 348). Some of the stages from FIG. 2 were not included for the sake of simplicity, but the point of FIG. 7 is to illustrate that session identifiers can be used to facilitate retrieval of information from cookies when multiple instances of the same application are executing in one or more web browsers at the same time. The session identifiers allow the correct version of data to be retrieved from the cookies for the given session.

Figure 8:
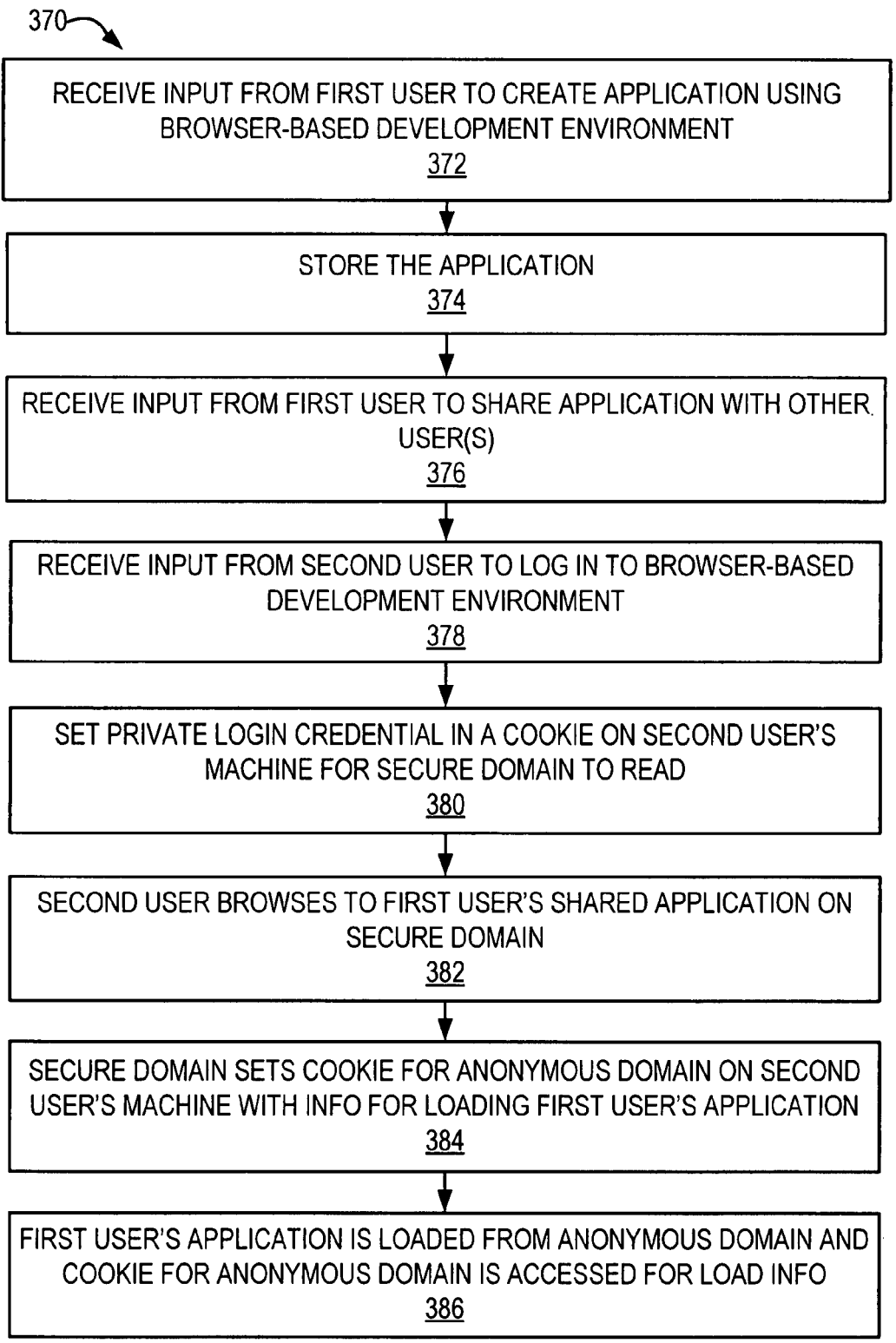
FIG. 8 is a process flow diagram for one implementation that illustrates the stages involved in sharing applications created in a browser-based software development environment among users.

Turning now to FIG. 8, a process flow diagram 370 is shown for one implementation of the stages involved in sharing applications created in a browser-based development environment. Some of the stages of FIG. 8 are similar to the example previously described in FIGS. 3-6 and/or other figures, but are presented in the form of a flow diagram for further illustration. Input is received from a first user to create an application using a browser-based development environment (stage 372). The development environment stores the application (stage 374), such as upon user selection of a save operation. Input is received from the first user to share the application with other user(s) (stage 376). Input is then received from a second user to log into a browser-based development environment (stage 378). A private login credential is set in a cookie on the second user's computer for the secure domain to read (stage 380). The second user browses to the first user's shared application on the secure domain (stage 382). The secure domain sets a cookie for the anonymous domain on the second user's computer with information for loading the first user's application (stage 384). The first user's application is loaded (e.g. served up) from the anonymous domain and the cookie for the anonymous domain is read for load information (stage 386).

Figure 9:
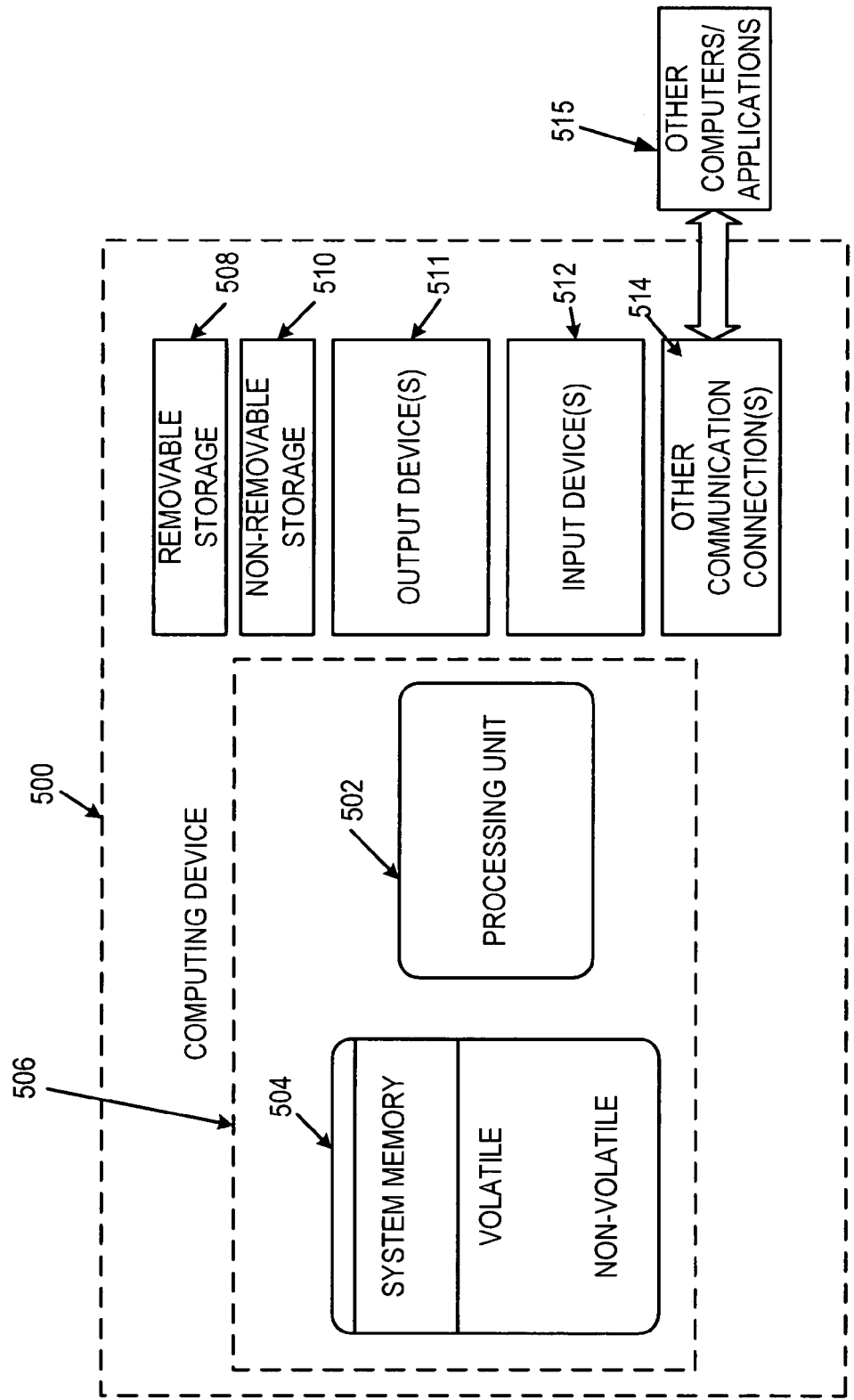
FIG. 9 is a diagrammatic view of a computer system of one implementation.

Turning now to FIG. 9, an exemplary computer system to use for implementing one or more parts of the system is shown that includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 9 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 9 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A system, the system comprising:
 a processor;
 system memory; and
 one or more computer storage devices having stored thereon a computer-executable instructions representing a security system for a browser-based environment, the security system including a first browser application configured to:
 host one or more other applications;
 load the one or more other applications on one or more separate domains other than a host domain; and
 use one or more cookies as a two-way communication method between the first browser application and the one or more other applications.

2. The system of claim 1, wherein the first browser application is a software development application.

3. The system of claim 2, wherein the one or more other applications are browser applications that were developed by one or more users of the software development application.

4. The system of claim 1, wherein the host domain is a secure domain and the one or more separate domains are anonymous domains.

5. The system of claim 1, wherein the one or more cookies are used to ensure the communication method between the first browser and the one or more other applications is secure.

6. The system of claim 1, wherein the first browser application sets a first cookie on the one or more other applications by loading a page on the one or more separate domains of the one or more other applications.

7. The system of claim 6, wherein the first browser application accesses a second cookie on the host domain to determine a result of the one or more other applications.

8. The system of claim 7, wherein a creation of the second cookie was initiated by the one or more other applications upon completion of an operation.

9. A computer program product for use at a computer system, the computer program product for implementing a method for enhancing security in a browser-based development environment, the computer program product comprising one or more computer-readable storage devices having stored thereon computer-executable instructions, that when executed at a processor, cause the computer system to perform the method including the following:
receiving input from a user to access a first browser application on a first domain;
receiving a selection from the user to run a second browser application from within the first browser application;
while operating within the first browser application on the first domain, creating a first cookie in a second domain, the first cookie containing information to be used by the second browser application;
loading the second browser application on the second domain; and
while operating within the second browser application on the second domain, creating a second cookie in said first domain, said second cookie containing information to be used by the first browser application.

10. The computer program product of claim 9, further comprising computer-executable instructions that, when executed, cause the computer system to perform the following:
accessing a second cookie in the first domain to determine a result of an operation performed by the second browser application.

11. The computer program product of claim 10, wherein the second cookie is created on the first domain by a creation operation initiated from the second browser application on the second domain.

12. The computer program product of claim 11, wherein the creation operation is initiated from the second browser application when the second browser application loads a page of the first browser application.

13. The computer program product of claim 9, wherein the first cookie is created on the second domain when the first browser application loads a page of the second browser application.

14. The computer program product of claim 9, wherein the first browser application is a software development application.

15. The computer program product of claim 14, wherein the software development application supports multiple users.

16. The computer program product of claim 9, wherein a session identifier is included in the first cookie so the second browser application can read a correct version of the information.

17. A method for enhancing security in a browser-based development environment comprising:
receiving input from a first user to create an application using a browser-based development environment, the browser-based development environment executing on a host domain and with a first computer;
receiving input from the first user to share the application to a second user;
receiving input from the second user to log in to the browser-based development environment;
receiving input from the second user to browse to the application created by the first user;
setting a first cookie on a second computer of the second user with information for loading the application created by the first user; and
loading the application on a separate domain from the host domain of the browser-based development environment using the information for loading the application.

18. The method of claim 17, wherein upon receiving input from the second user to log in, a private login credential is set in the first cookie on the computer of the second user.

19. The method of claim 17, further comprising:
accessing a second cookie on the host domain, the second cookie containing results from the application.

* * * * *